UNITED STATES PATENT OFFICE.

CORYDON P. KARR, OF PITTSBURGH, PENNSYLVANIA, ASSIGNOR TO JOSEPH M. FLANNERY, OF PITTSBURGH, PENNSYLVANIA.

LUMINOUS COMPOSITION.

1,097,979.    Specification of Letters Patent.    Patented May 26, 1914.

No Drawing.    Application filed August 15, 1912.   Serial No. 715,211.

*To all whom it may concern:*

Be it known that I, CORYDON P. KARR, a resident of Pittsburgh, in the county of Allegheny and State of Pennsylvania, have invented certain new and useful Improvements in Luminous Compositions; and I do hereby declare the following to be a full, clear, and exact description of the invention, such as will enable others skilled in the art to which it appertains to make and use the same.

This invention relates to improvements in luminous compositions,—the object of the invention being to provide a luminous substance which may be made in the form of a paint, paste, wax or enamel, and which will retain its luminosity for a considerable period of time.

With this object in view, the invention consists in a certain novel composition as hereinafter set forth and pointed out in the claims.

For a paint, I first prepare a composition of the following ingredients; zinc oxid, barium carbonate, silica in a hydrogel state, freshly precipitated barium sulfate, asbestine (which is a hydro-silicate of alumina in a hydrogel state), zinc sulfid in a colloidal state, and barium (in the form of hydrosulfo oxid of barium) in a hydrogel state in approximately equal proportions and in liquid form. All of the above materials will be prepared in a colloidal, hydrogel or hydrosol state, and when intimately mixed, a substance will be formed which is capable of receiving, retaining and emitting radioactive emanations in considerable volume and brilliance and for a great length of time. The composition will be subjected to the emanations of some radio-active or radio-exciting bodies until it becomes impregnated with radio-active properties and throw off rays of light. The composition above described may be mixed with or brought into intimate contact with the radio-emanating material so that the whole mass will become radio-active.

The radio-active substance employed to communicate the property of luminous ray emanations to the composition or to impregnate the same with luminescence, may be salts of radium X, thorium X, mesothorium, ionium, actinium and polonium. After the composition has become saturated or impregnated with the emanations of said radio-active bodies, it is submitted to a drying process and then ground in a suitable paint drying oil, such as menhaden oil or any suitable paint oil, (except linseed oil), and then mixed with suitable driers.

Having fully described my invention what I claim as new and desire to secure by Letters-Patent, is:

1. A luminescent substance consisting of the admixture of a plurality of radio-receptive substances in a hydrogel state and impregnated with radio-active emanations.

2. A luminescent composition consisting of the intermixed radio-receptive salts of a plurality of bases in a hydrogel state and impregnated with radio-active emanations.

3. A luminescent composition, containing zinc oxid, barium carbonate, silica in a hydrogel state, barium sulfate, asbestine in a hydrogel state, zinc sulfid in a colloidal state, barium in a hydrogel state, and a radio-excitant.

In testimony whereof, I have signed this specification in the presence of two subscribing witnesses.

CORYDON P. KARR.

Witnesses:
A. S. FERGUSON,
S. S. NOTTINGHAM.